Figure 1:
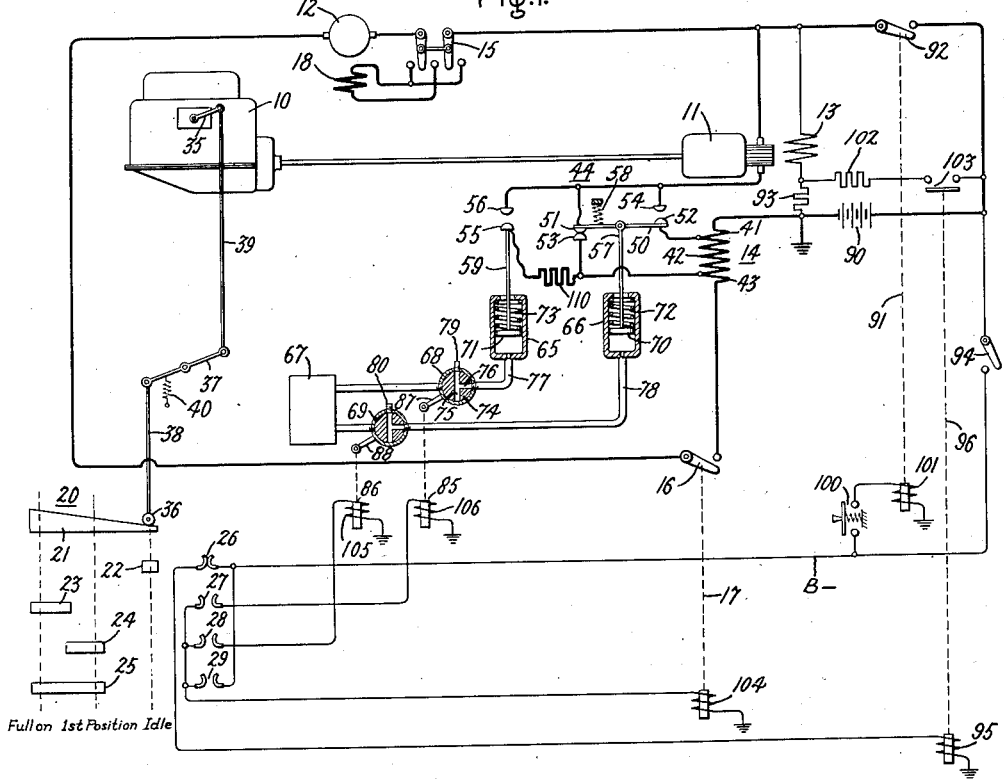

July 21, 1942. J. C. AYDELOTT 2,290,667

POWER SYSTEM

Filed June 5, 1941

Inventor:
John C. Aydelott,
by Harry E. Dunham
His Attorney,

Patented July 21, 1942

2,290,667

UNITED STATES PATENT OFFICE 2,290,667

POWER SYSTEM

John C. Aydelott, Erie, Pa., assignor to General Electric Company, a corporation of New York Application June 5, 1941, Serial No. 396,685

5 Claims. (Cl. 290—17)

My invention relates to power systems and particularly to gas-electric or Diesel-electric power systems for self-propelled vehicles.

It is well known that the power output characteristics of an electric generator and an internal combustion engine differ widely. Over a large portion of the operating range of a gas-electric or Diesel electric power system the full speed power demand of the generator exceeds the power output of the engine. Consequently the generator characteristic is made to conform to the engine characteristic by slight engine stalling within this range, while the engine speed is ordinarily controlled by an overspeed governor at all other operating points. The range of loads within which slight engine stalling takes place is referred to as the generator "wrap-around." While it is desirable to increase the "wrap-around" since maximum engine output is utilized only within this load range, any increase in wrap-around is accompanied by an increase in the maximum amount of engine stalling. In an attempt to utilize the maximum available power of the engine over as wide a range as possible, compromise has heretofore been sought at the expense of one or another operating characteristic. One result has been that in gas-electric or Diesel electric vehicles heretofore built the engine has a tendency to race at the beginning of the accelerating cycle and then to decrease in speed as the vehicle speed increases. In addition to the undesirable psychological effect of a racing engine at very low vehicle speed, the tractive effort characteristic becomes such that smooth and gradual control of the vehicle at low speed is impossible. Maximum engine horsepower output is, of course, available only at full torque output and full speed of the engine. Most power systems in use today have been designed primarily to transmit this maximum engine output to the wheels of the vehicle over the operating range of vehicle speed. There are, however, circumstances under which it is desirable to operate at partial engine horsepower. Power systems in use heretofore have been inadequate to provide acceptable characteristics at partial engine power. A generator with an inherent characteristic such that it permits the engine to run at nearly constant speed and maximum torque over the full operating range of current and voltage, necessarily rapidly decreases in output at only slightly reduced speed. As a result, in order to obtain say a quarter of full output, it is necessary to bring the engine up to practically full speed. Under these circumstances a slight change in engine speed will cause a large change in generator output and the output is not easily controlled. If, for instance, an operator is trying to move the vehicle precisely a definite short distance, as in coupling a locomotive to a car or in maneuvering a bus in a garage or in parking, it is very objectionable at the beginning of the movement to have to wait for the engine to increase in speed from idling almost to full speed before any output is obtained, and also very objectionable when the vehicle finally starts moving to get many times the desired output and thus accelerate the vehicle.

Accordingly, it is an object of my invention to provide a gas-electric power system for an electrically driven vehicle in which more efficient utilization is made of the available engine characteristics in accordance with the principle that within limits it is preferable to take partial power from an engine at low speed and high torque rather than at high speed and low torque.

It is a further object of my invention to provide a gas-electric vehicle power system in which when maximum initial acceleration is not desired the speed of the internal combustion engine is more nearly proportional to the vehicle speed.

Another object of my invention is to provide a gas-electric vehicle which may be smoothly and gradually controlled at very low speed, while alternatively high acceleration at maximum horsepower is obtainable at will.

It is still another object of my invention to provide a gas-electric vehicle power system in which the initial tractive effort is applied to the driving wheels smoothly and is maintained at an only slightly decreasing value as the vehicle speed, the engine speed, and the power increase.

It is a specific object of my invention to provide a generator with special means which will improve the operating characteristics of the gas-electric system as a whole and which may also be used to crank a connected internal combustion engine.

The above objects and consequent advantages of my invention may be attained by providing the generator of a gas-electric vehicle with sufficient cumulative series fields to make the generator torque equal to the engine torque at currents in the middle of the operating range and at low engine speed. With this arrangement the maximum stall may be made to occur before the vehicle is set in motion, so that as the vehicle speed increases the engine speed likewise increases to give a "geared-in" effect and avoid the disadvantage of engine racing at low speed.

Figure 2:
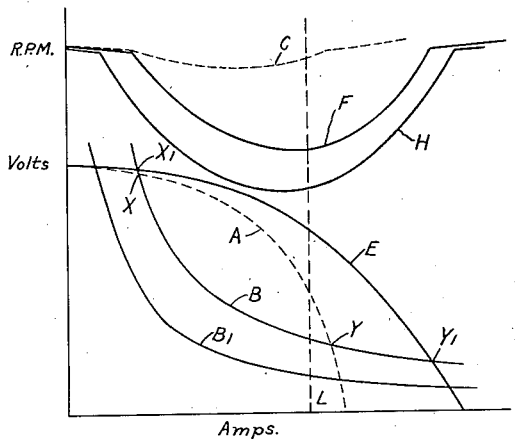
Figure 3:
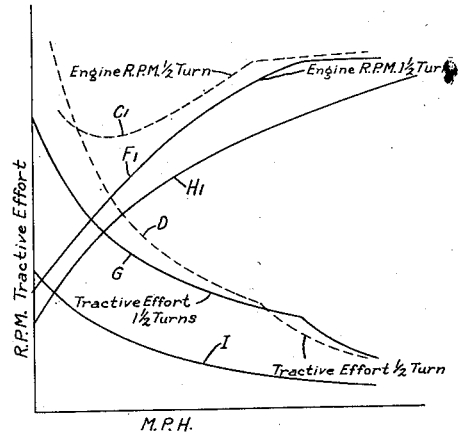

My invention will be better understood and further objects and advantages will be appreciated by referring now to the following detailed specification taken in conjunction with the accompanying drawing in which Fig. 1 is a diagrammatic representation of a power system embodying my invention; and Figs. 2 and 3 are generator and engine characteristic curves which clarify the operation of a system arranged in accordance with my invention.

Referring now to the drawing, and particularly to Fig. 1, I have shown an internal combustion engine 10 connected to drive a direct current generator 11, which supplies current to a load circuit including a reversible traction motor 12. The generator 11 is provided with a shunt field winding 13 and a series field winding 14 and is connected to the traction motor 12 through a reversing switch 15 and the switch contact 16 of a line breaker 17. The motor 12 is excited by a series field winding 18. Control of the entire system may be effected through a manually operable controller 20 which comprises a plurality of cam segments 21, 22, 23, 24 and 25 and a plurality of cam switches 26, 27, 28 and 29 operated by the cam segments 22–25, inclusive. An engine throttle control lever 35 is connected for operation by the controller cam segment 21 through a roller 36, a pivoted lever 37 and connecting rods 38 and 39. The throttle control lever is biased to the idling position, as shown, by means of a tension spring 40.

The generator series field winding 14 is divided into three portions 41, 42 and 43, which are controlled by a generator field switch 44 to connect the various portions as a cumulative series field for engine starting and for generating operation. The field switch mechanism 44 comprises a floating lever 50 carrying movable contacts 51 and 52 at opposite ends thereof for cooperation with stationary contacts 53 and 54, respectively, and a single movable contact 55 positioned to engage a stationary contact 56. The floating lever 50 is pivotally attached to an operating member 57 and the contact 51 is biased into engagement with the contact 53 by a compression spring 58. The single movable contact 55 is mounted upon an operating member 59.

In one preferred embodiment of my invention, such as I have illustrated at Fig. 1, the operating members 57 and 59 of the generator field switching mechanism 44 are moved by an electro-magnetically controlled pneumatic mechanism comprising a pair of air cylinders 65 and 66 connected to a source of compressed air supply, such as the main reservoir 67, through magnetically controlled valves 68 and 69, respectively. The operating members 57 and 59 are connected to pistons 70 and 71 positioned in pneumatic cylinders 66 and 65, respectively. The pistons 70 and 71 are adapted to be raised against the force of biasing springs 72 and 73, respectively, to operate the various contacts of the generator field switch 44. The valves 68 and 69 may be of any desired type, but for the sake of simplicity they are shown diagrammatically as each comprising a rotatable member 74, having air passages 75 and 76 for cooperation with conduits 77 and 78 connected to the cylinders 65 and 66, respectively, and with atmospheric vents 79 and 80. The valves 68 and 69 may be electrically operated by means of electromagnets 85 and 86 connected respectively to valve operating arms 87 and 88.

For cranking operation of the engine 10 the generator 11 may be operated as a motor from a storage battery 90. A starting contactor 91 having switch contacts 92 is arranged to connect the battery 90 across the generator armature and across the generator shunt field in series with a field resistor 93.

In operation a control switch 94 is first closed to connect the battery 90 with the manually operable controller 20 through a control bus B—. Upon closure of the control switch 94 an actuating coil 95 of a generator field teasing contactor 96 is energized through the cam switch 26 of the manual controller 20. In the idling position of the controller the cam switch 26 is maintained closed by the cam segment 22. To start the engine 10 a spring biased pushbutton 100 may be depressed to energize an actuating coil 101 of the starting contactor 91. The generator shunt field 13 is now energized from the battery 90 through the field resistor 93 and is shunted by a tease limiting resistor 102 through the contacts 92 of the starting contactor 91 and a contact 103 of the field teasing contactor 96. The armature of the generator 11 is also connected to the battery 90 in parallel with the shunt field 13 through the contacts 51 and 53 and field switching mechanism 44 and the portions 41 and 42 of the generator series field 14. The portion 42 comprises the main part of the generator series field winding 14 and is now connected as a cumulative series field for cranking operation of the engine 10. The small auxiliary portion 41 of the series field winding 14 is preferably but not necessarily connected in series with the portion 42 during cranking operation in cases where it is desirable to provide more series turns for engine cranking than for vehicle accelerating operation.

With the engine idling the generator field teasing contactor 96 is maintained closed through the cam switch 26 of the manual controller 20. The purpose and mode of operation of this generator field teasing connection is well known to those skilled in the art.

To initiate acceleration of the vehicle the controller 20 may be moved from its idling position to its "first position." By this movement an actuating coil 104 for the line breaker 17 is energized through the cam switch 29 and the engine throttle control lever 35 is moved by the roller 36 to partially open the throttle and increase the power output of the engine 10. At the same time the cam switch 26 is opened to de-energize the actuating coil 95 of the field teasing contactor 96. When the controller 20 reaches its "first position" the cam switch 28 is also closed to complete an energizing circuit for an actuating coil 105 of the electromagnet 86. Actuation of the electromagnet 86 raises the valve lever 88 and completes a connection from the main air reservoir 67 to the pneumatic cylinder 66 through valve 69. The application of air pressure to the piston 70 raises the operating member 57 and moves the contact 52 on the floating lever 50 into engagement with the stationary contact 54. During movement of the contact 52 the opposite end of the lever 50 which carries the contact 51 remains stationary under the influence of compression spring 58. As the upward movement of the operating member 57 continues after the contact 52 engages the contact 54, the contact 51 is separated from stationary contact 53. Thus, the movable contacts 52 and 51 engage and disengage their respective stationary contacts sequentially to first shunt the portion 42 of the series field winding 14 and then connect it in series with the motor circuit. Thus, in the first position of the controller 20 the generator series field includes the portions 42 and 43 of the field winding 14.

If the manual controller 20 is now moved to its "full on" position the cam switch 27 is first closed by the cam segment 23 to complete an energizing circuit for an actuating coil 103 of the electromagnet 85, and subsequently the cam switch 28 is opened by the cam segment 24 to disable the actuating coil 105 of the electromagnet 86. Actuation of the electromagnet 85 operates the magnet valve 68 to apply air pressure to the piston 71 and close the field switch contacts 55 and 56. The closure of the contacts 55 and 56 shunts the portion 42 of the series field winding 14 through a resistor 110. Subsequent deenergization of the electromagnet 86 allows the valve 69 to return to its position as shown in Fig. 1 and vents the cylinder 66 to atmosphere. Venting of the cylinder 66 permits the spring 72 to move the floating lever 50 downward. In moving back to its deenergized position the lever 50 first closes the contacts 51 and 53, completely to short circuit the portion 42 of the series field winding, and then opens the contacts 52 and 54, to disconnect the portion 42 of the series field winding and complete a new motor circuit through the contacts 51, 53 and the small portion 43 of the field winding 14. It will be understood that, while it is desirable to gradually disable the portion 42 of the series field winding in two steps by means of the contacts 55, 56 and the resistor 110, I do not desire that my invention be limited to a two step removal of the series field from the load circuit. It will be evident to those skilled in the art that even were the contacts 55 and 56 omitted, the floating lever 50 alone is capable of disabling the portion 42 of the series field winding without interrupting the load circuit, but it is highly desirable to provide one or more shunting resistors, such as the resistor 110, so that the series field winding may be gradually rather than abruptly short circuited.

The portion 43 of the series field winding 14 is a relatively small part of the winding and is preferably, though not necessarily, provided in load equipments where it is desirable to include a small section of series field in the final full power connection.

Referring now to Fig. 2, the curve A represents the volt ampere characteristic of a slightly cumulatively compounded generator; for example, a generator having one-half turn of series field. The engine output is very nearly constant over a wide range of generator loads and is represented by a curve B which differs only slightly from an equilateral hyperbola. The curve C represents the engine speed in R. P. M. for a system having the output characteristics shown by the curves A and B. It will be observed that between the points X and Y where the curve A intersects the curve B, the engine speed diminishes due to the fact that the generator is demanding more power than the engine is able to deliver. At generator loads both above and below the points X and Y the engine speed is maintained substantially constant by an overspeed governor (not shown). The curves B and C have been drawn to represent an engine operating with the throttle fully open. It will now be understood from the curve C that the curve B between the points X and Y does not exactly follow a constant horsepower curve because of the slightly reduced engine speed while the engine torque remains substantially constant.

From the curve C it may also be seen why a gas-electric power plant with little or no series field on the generator will race at low vehicle speed. If it is assumed that at a current value of the L the traction motors will develop sufficient torque to start the vehicle in motion, it will be observed from the curve C that, as the generator load decreases with increasing vehicle speed the engine speed will decrease. Thus during the starting period the engine speed is changing in a sense opposite to the direction of change of the vehicle speed. This racing of the engine at low vehicle speeds produces undesirable psychological effects and results in a sudden application of extremely high initial torque to the driving wheels. This latter effect may be observed from the curves of Fig. 3.

In Fig. 3 the dotted curves C' and D represent engine speed and tractive effort, respectively, plotted against vehicle speed in miles per hour in a system having the output characteristics shown by the curves A and B of Fig. 2. It will again be observed that the engine speed decreases to a minimum value with decreasing vehicle speed and then increases rapidly as the vehicle speed falls to zero. The tractive effort characteristic is also undesirable in that the initial or starting tractive effort attains an extremely high value.

Referring again to Fig. 2, the curve E represents the volt ampere characteristic of a cumulatively compounded generator having an appreciable series field of perhaps one and one-half turns. Due to the strong series field the curve E intersects the curve B far out at its high current end, while at its low current end it intersects B at substantially the same point as does the curve A. The high current limit of generator wraparound now occurs at a point $Y_1$, and the low current limit occurs at a point $X_1$. Thus the generator wrap-around has been appreciably increased without substantially changing its low current limit, thereby to raise the current value at which the minimum engine speed occurs. Under these conditions the engine speed will follow the curve F. It is apparent that the load current L necessary to start the vehicle in motion occurs at approximately the minimum point of the curve F, so that as the vehicle speed increases the engine speed likewise increases to give a "geared-in" effect.

The advantages of the cumulative generator series field may be further appreciated by referring to the curves $F_1$ and G of Fig. 3, which represent respectively, the engine speed and the tractive effort at full engine torque in a power system whose output characteristics are represented by the curves B and E of Fig. 2. In Fig. 3 it will be observed that the engine speed curve $F_1$ no longer has a minimum value, thus indicating that the engine does not race at low vehicle speeds. Furthermore, the tractive effort curve G no longer rises to an uncontrollable initial value as does the curve D.

At curves $B_1$, E and H of Fig. 2, and curve $H_1$ and I of Fig. 3, I have shown the partial torque characteristic of the system having the full torque characteristics represented by the curves B, E, F, $F_1$ and G. From the curve $H_1$ of Fig. 3 it will be seen that racing of the engine is still avoided, while the curves $B_1$ and I indicate that the tractive effort is approximately proportional to the engine output. The curve $B_1$ represents one-half maximum engine torque, and the curve I shows that the tractive effort under this condition is approximately one-half the tractive effort at maximum engine torque as shown by the curve G.

In view of the foregoing detailed description it will now be evident that I have provided a new and improved means for controlling a generator series field in a gas-electric power system to assist in cranking the engine and to improve the operating characteristics by eliminating racing of the engine at low vehicle speeds, increasing the range of utilization of maximum engine output, and limiting the value of tractive effort applied to the wheels at starting.

Although I have shown and described but one preferred embodiment of my invention by way of illustration, many modifications will occur to those skilled in the art, and I therefore wish to have it understood that I intend by the appended claims to cover all such modifications as fall within the true spirit and scope of my invention.

What I claim as new and desire to secure by Letters Patent of the United States, is:

1. In a power system for a self-propelled electric vehicle, a generator having a shunt field winding, an internal combustion engine for driving said generator, a throttle valve for said engine, control means for said throttle valve having idling partial power and full power positions, a series field winding in said generator, switching means operable in conjunction with said control means to establish a load circuit for said generator which excludes said series field winding when said control means is in said idling position, said switching means being arranged to connect said series field winding in said load circuit without interrupting said circuit when said control means is in said partial power position and gradually to disable said series field winding without interrupting said load circuit when said control means is in substantially said full power position.

2. In a power system for a self-propelled electric vehicle, a generator having a shunt field winding, an internal combustion engine for driving said generator, a starting switch for connecting said generator to a source of electric supply for cranking said engine, a series field winding for said generator, first switching means for connecting said series field winding in circuit with said generator during cranking operation of said engine, means for establishing a load circuit for said generator initially excluding said series field winding, and second switching means controlled in accordance with the power input to said engine to connect said series field winding in said load circuit during partial power operation of said engine and to disable said series field winding during substantially full power operation of said engine without interrupting said load circuit.

3. In a power system for a self-propelled electric vehicle, a generator having a shunt field winding, an internal combustion engine for driving said generator, a starting switch for connecting said generator to a source of electric supply for cranking said engine, a series field winding for said generator, means for connecting said series field winding in circuit with said generator in a cumulative sense during cranking operation, control means for said engine having idling, partial power and full power positions, means for completing a load circuit for said generator which excludes said series field winding in the idling position of said control means, and switching mechanism operable in conjunction with said control means to connect said series field winding in said load circuit in a cumulative sense in said partial power position of said control means and to disable said winding in said full power position of said control means without interrupting said load circuit.

4. In a power system for a self-propelled electric vehicle, a generator having a shunt field winding, an internal combustion engine for driving said generator, control means for said engine, a series field winding for said generator comprising a main portion and two auxiliary portions, a starting switch for connecting said generator to a source of electric supply to complete a starting circuit for said generator including said main portion and one of said auxiliary portions of said series field winding, means for establishing a load circuit for said generator initially including only the other of said auxiliary portions of said series field winding, and switching means operable in conjunction with said control means to connect said main portion of said series field winding in said load circuit during partial power operation of said engine and to disable said main portion of said series field winding under maximum power output conditions of said engine without interrupting said load circuit.

5. In a power system for a self-propelled electric vehicle, a generator having a shunt field winding, an internal combustion engine for driving said generator, a throttle valve for controlling said internal combustion engine, a manually operable controller for operating said throttle valve having idling, partial power and full power positions, a series field winding for said generator comprising a main portion and two auxiliary portions, a starting switch for connecting said generator to a source of electric supply to complete a starting circuit for said generator including said main portion and one of said auxiliary portions of said series field winding in a cumulative sense thereby to crank said engine, means for establishing a load circuit for said generator with said controller in said idling position, said load circuit including only the other of said auxiliary portions of said series field winding, first switching means operable by said controller to connect said main portion of said series field winding in said load circuit in a cumulative sense without interrupting said circuit when said control means is in said partial power position, and second switching means including said first switching means for disabling said series field winding sequentially in a plurality of steps and without interrupting said load circuit when said control means is in substantially said full power position.

JOHN C. AYDELOTT.